United States Patent
Chang et al.

(10) Patent No.: US 12,254,089 B1
(45) Date of Patent: Mar. 18, 2025

(54) MALWARE FAMILIES IDENTIFICATION BASED UPON HIERARCHICAL CLUSTERING

(71) Applicant: Trend Micro Inc., Tokyo (JP)

(72) Inventors: Yin-Ming Chang, Taipei (TW); Hsing-Yun Chen, Taipei (TW); Hsin-Wen Kung, Taipei (TW); Li-Chun Sung, Taipei (TW); Si-Wei Wang, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 38 days.

(21) Appl. No.: 18/535,386

(22) Filed: Dec. 11, 2023

Related U.S. Application Data

(62) Division of application No. 16/811,651, filed on Mar. 6, 2020, now Pat. No. 11,886,586.

(51) Int. Cl.
*G06F 21/56* (2013.01)
*G06F 9/54* (2006.01)
*G06F 18/23213* (2023.01)

(52) U.S. Cl.
CPC .............. *G06F 21/566* (2013.01); *G06F 9/54* (2013.01); *G06F 18/23213* (2023.01); *G06F 21/568* (2013.01)

(58) Field of Classification Search
CPC ...... G06F 21/566; G06F 21/568; G06F 21/56; G06F 9/54; G06F 18/23213
USPC ......................................................... 726/24
See application file for complete search history.

(56) References Cited

U.S. PATENT DOCUMENTS

| | | | |
|---|---|---|---|
| 8,266,698 B1 * | 9/2012 | Seshardi | G06F 21/53 726/25 |
| 8,769,676 B1 * | 7/2014 | Kashyap | G06F 21/554 726/22 |
| 9,130,778 B2 * | 9/2015 | Dichiu | H04L 51/212 |
| 10,922,410 B2 * | 2/2021 | Chistyakov | G06N 20/00 |
| 10,972,495 B2 * | 4/2021 | Berlin | G06F 21/56 |

(Continued)

OTHER PUBLICATIONS

Yihua Liao, V. Rao Vemuri,, Department of Computer Science University of California, Title "Use of K-Nearest Neighbor classifier for intrusion detection" (Year: 2002).*

(Continued)

*Primary Examiner* — Samson B Lemma
(74) *Attorney, Agent, or Firm* — Beyer Law Group LLP

(57) ABSTRACT

Behavior report generation monitors the behavior of unknown sample files executing in a sandbox. Behaviors are encoded and feature vectors created based upon a q-gram for each sample. Prototypes extraction includes extracting prototypes from the training set of feature vectors using a clustering algorithm. Once prototypes are identified in this training process, the prototypes with unknown labels are reviewed by domain experts who add a label to each prototype. A K-Nearest Neighbor Graph is used to merge prototypes into fewer prototypes without using a fixed distance threshold and then assigning a malware family name to each remaining prototype. An input unknown sample can be classified using the remaining prototypes and using a fixed distance. For the case that no such prototype is close enough, the behavior report of a sample is rejected and tagged as an unknown sample or that of an emerging malware family.

12 Claims, 14 Drawing Sheets

(56) References Cited

U.S. PATENT DOCUMENTS

| | | | | |
|---|---|---|---|---|
| 11,036,858 | B2* | 6/2021 | Chistyakov | G06F 21/552 |
| 2010/0122343 | A1* | 5/2010 | Ghosh | G06F 9/45545 |
| | | | | 726/23 |
| 2011/0093953 | A1* | 4/2011 | Kishore | G06F 21/629 |
| | | | | 726/24 |
| 2014/0113588 | A1* | 4/2014 | Chekina | G06N 20/00 |
| | | | | 455/410 |
| 2014/0157407 | A1* | 6/2014 | Krishnan | G06F 21/53 |
| | | | | 726/22 |
| 2016/0057159 | A1* | 2/2016 | Yin | H04L 63/145 |
| | | | | 726/23 |
| 2019/0318091 | A1* | 10/2019 | Gupta | G06F 21/566 |
| 2021/0089647 | A1* | 3/2021 | Suwad | G06F 21/552 |

OTHER PUBLICATIONS

[Rieck et al., 2011] Konrad Rieck, Philipp Trinius, Carsten Willems, and Thorsten Holz, "Automatic Analysis of Malware Behavior using Machine Learning", *Journal of Computer Security (JCS)*, 19 (4), 639-668, Jun. 2011.

[Rieck et al., 2009], A Malware Instruction Set for Behavior-Based Analysis.

[Garey et al., 1979] M. Garey, and D. Johnson, *Computers and Intractability: A Guide to the Theory of NP-Completeness*. Freeman and Co., 1979.

[Gonzalez 1985] T. Gonzalez, "Clustering to minimize the maximum intercluster distance", *Theoretical Computer Science*, vol. 38, pp. 293-306, 1985.

[Duda et al., 2001] R. Duda, P.E. Hart, and D.G. Stork. *Pattern classification*. John Wiley & Sons, second edition, 2001.

Gary L. Miller, Shang-Hua Teng, and Stephen A. Vanasis, "Separators for Sphere-Packings and Nearest Neighbor Graphs", Journal of the ACM, vol. 44, No. 1. 1997, pp. 1-29.

[Bauer et al., 2006] Douglas Bauer, Hajo Broersma, and Edward Schmeichel, "Toughness in Graphs—A Survey", Graphs and Combinatorics, vol. 22, No. 1, 2006, pp. 1-35.

Chang et al., U.S. Appl. No. 16/811,651, filed Mar. 6, 2020.

\* cited by examiner

402 → 09 15 1 80100080 018B0653 1 0 00000168 1 0 [ARBITRARY_INDEX_NUMBER]

⎵ MIST LEVEL 1 404　⎵ MIST LEVEL 2 408　⎵ MIST LEVEL 3 412

| | REPORT X |
|---|---|
| S₁ | CREATEFILEA → WRITEFILE |
| S₂ | 422 |
| S₃ | WRITEFILE → CLOSEHANDLE |
| S₄ | CLOSEHANDLE → WAITSINGLEOBJECT |
| S₅ | |
| S₆ | |
| S₇ | |
| S₈ | |

451

430

| REPORT Y |
|---|
| CREATEFILEA → WRITEFILE |
| WRITEFILE → READFILE |
| READFILE → WRITEFILE |
| WRITEFILE → CLOSEHANDLE |
| 432 |

452

440

| REPORT Z |
|---|
| |
| |
| |
| |
| REGOPENKEYEA → REGQUERYVALUEEXA |
| REGQUERYVALUEEXA → |
| REGSETVALUEEXA |
| REGSETVALUEEXA → REGCLOSEKEY |
| 442 |

Q-GRAM EXAMPLE (BI-GRAM)

FIG. 4B

FEATURE VECTORS OF SAMPLES

AFTER PROTOTYPE EXTRACTION

AFTER K-NEAREST NEIGHBOR
GRAPH CONSTRUCTION

MALWARE FAMILIES IDENTIFICATION BASED UPON HIERARCHICAL CLUSTERING

CROSS-REFERENCE TO RELATED APPLICATIONS

This application is a Divisional of U.S. application Ser. No. 16/811,651, filed on Mar. 6, 2020, which is incorporated by reference in its entirety.

FIELD OF THE INVENTION

The present invention relates generally to malware identification. More specifically, the present invention relates to use of feature vectors, clustering and merging of prototype samples to identify malware families.

BACKGROUND OF THE INVENTION

Automatic identification of malware families and their variants are important tasks in the area of computer security research. Such automatic identification not only helps to reduce the human effort in analyzing huge amounts of malware variants (which variants are emerging every single day), but also mitigates the dangers caused by an outbreak of malware in the early stage by comparing unknown samples with known malware clusters.

Traditional malware analysis focuses on the static features of binary executables, including PE headers, DLL export function tables, true-file types, or particular meta-data. The static analysis is efficient and useful for providing a first glance result. Its applicable scenarios are usually limited, though, when packing programs or obfuscation techniques are used. By contrast, dynamic features analysis focuses on API calls, file access events, or registry access during run time, which analysis captures a more realistic result of malware behavior. Such analysis, however, is conducted based on lengthy sequential data, which is hard to automate and requires substantial human effort to create detecting or monitoring rules. Moreover, it is always hard to say if two unknown samples belong to the same family (or belong to the same attacking campaign) since the pair-wise distance and topology relationship of samples cannot be guaranteed consistently and varies with different malware families and variants.

Accordingly, new techniques and systems are desired to automatically analyze the dynamic behaviors of unknown malware samples to determine if the sample belongs to a known malware type or to an emerging malware type.

SUMMARY OF THE INVENTION

To achieve the foregoing, and in accordance with the purpose of the present invention, a technique is disclosed that accepts domain expert input, uses hierarchical clustering, and does not use a fixed-distance threshold to merge sample prototypes in order to identify malware families.

To address the above problems in the prior art, we propose a methodology of semi-automated analysis of a malicious executable based upon its dynamic behaviors and also upon domain expert input. In addition, to resolve the issue of granularity inconsistency among different distance thresholds for malware families, we incorporate the K-Nearest Neighbors Graph and allow security researchers to inspect the relationship between samples and clusters in different K levels.

The invention also has the following advantages. The invention automatically inspects the input, checking whether the input belongs to a known cluster or to a newly emerged malware type. The invention reduces the human labeling effort required to analyze huge amounts of malware samples by clustering samples which share similar executing behavior into groups of prototypes. The invention gives a meaningful malware name to discovered malware (instead of giving a generic name) by having an expert analyze only the malware prototypes (instead of analyzing all samples), providing labels, and then merging the prototypes.

BRIEF DESCRIPTION OF THE DRAWINGS

The invention, together with further advantages thereof, may best be understood by reference to the following description taken in conjunction with the accompanying drawings in which:

FIG. 4A illustrates how a particular API call and its arguments are encoded and structured.

FIG. 4B shows an example bi-gram.

DETAILED DESCRIPTION OF THE INVENTION

Figure 1:
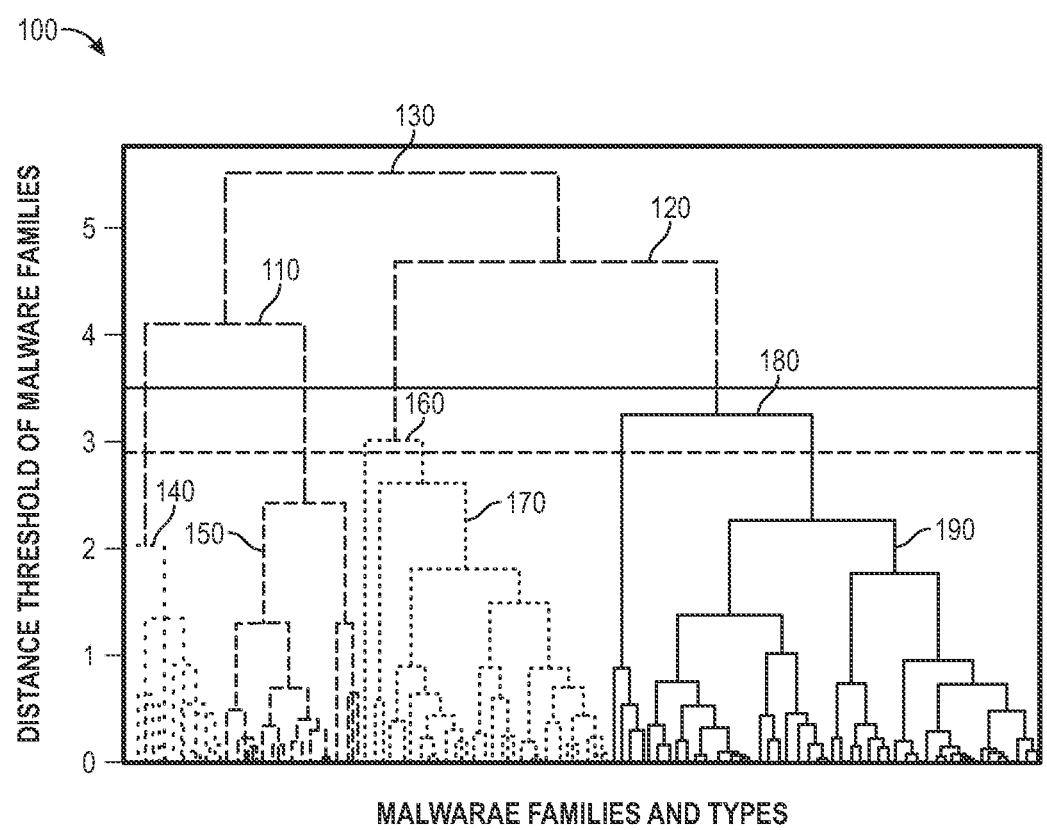
FIG. 1 illustrates malware families versus a distance threshold between malware families and variants.

To identify if an unknown sample belongs to a known malware type or to an unknown newly-emerged malware type, a robust representation is required for measuring similarities between arbitrary sample pairs. Traditional cryptographic hash functions such as SHA-1 or MD5 focus on malicious changes. The goal of these hash functions is to reflect subtle changes of input samples by a completely different hash value, which is not a suitable representation to be used by similarity metrics. The locality-sensitive hash functions such as Cluster-based Locality-Sensitive Hashing (CLSH) or Trend Micro Locality Sensitive Hash (TLSH) resolve the aforementioned problem by reflecting the scale of changes or differences between whole files or specific code blocks of two samples in its corresponding hash value. Such similarity comparison mechanisms between two hash values, however, can be attacked by processing samples with packing programs or obfuscation techniques.

To mitigate such impacts, malware samples are represented based on their executing behavior, and we adopt the malware instruction set (MIST) technique. This technique captures the executing behavior of the samples by a sandbox, then converts the sandbox report to the feature vector, where each dimension represents the number of occurrences of the API calls made by the sample (i.e., an n-gram). After such pre-processing of the malware sample, the sample is represented by a fixed-dimension feature vector, which simultaneously captures the dynamic behavior and can be used for subsequently clustering, merging and classification tasks.

Once the feature vector of each Malheur report is computed, the typical tasks are: (1) clustering the Malheur reports which share similar behavior patterns or characteristics into clusters; and (2) using the clusters found in the previous step to predict whether an unknown input file sample belongs to a known cluster by classification. Traditional clustering such as K-means, mean-shift, or spectral clustering aims to partition n observations into k clusters, which requires the parameter k (i.e., the number of clusters) being set at the beginning. Since the amount of malware types and variants keep growing, however, the parameter k is hard to determine and cannot be fixed in a real-world application. Moreover, the clustering task is an NP-hard problem, which is exponential-time solvable. Tackling the clustering task with traditional clustering methods on a huge amount of malware samples would be a time-consuming task.

To resolve the aforementioned issues, a hierarchical clustering technique proposed by [Duda et al., 2001] is adopted. First, prototypes are extracted to represent all samples using smaller groups of samples. Then, we aggregate prototypes with a pair-wise distance less than a variable threshold by merging them. The whole process of prototype extraction and merging can be done in linear time. In addition, the number of clusters is not needed to be determined at first. The remaining problem is then to determine the distance threshold used in hierarchical clustering. The distance threshold, though, varies with malware families and variants, as we have realized.

FIG. 1 illustrates malware families versus a distance threshold between malware families and variants. Here, the horizontal axis denotes the malware families and types, and the vertical axis describes the distance threshold for merging clusters. As shown, the smaller the distance threshold that is set, the more different sub-types of clusters are generated; similarly, the larger the distance threshold, the fewer clusters that are generated. In addition, the malware sub-families and sub-types branches are generated at different distance thresholds for the main categories of clusters. I.e., the main categories of clusters are: 110, 120 and 130; 140 and 150; 160 and 170; and 180 and 190. As shown, the sub-families of these main clusters are generated at different distance thresholds.

Based on the observations above, we draw the following conclusions: (1) the malware families and variants cannot be defined by a single distance threshold effectively; and (2) different distance thresholds provide different fine-grained granularity for malware analysis. For these reasons, one advantage of the invention is that it provides a platform for security experts to efficiently analyze a large amount of malware samples at different similarity levels and to determine a suitable distance relationship for merging prototypes.

Overview of Analysis Framework

Figure 2:
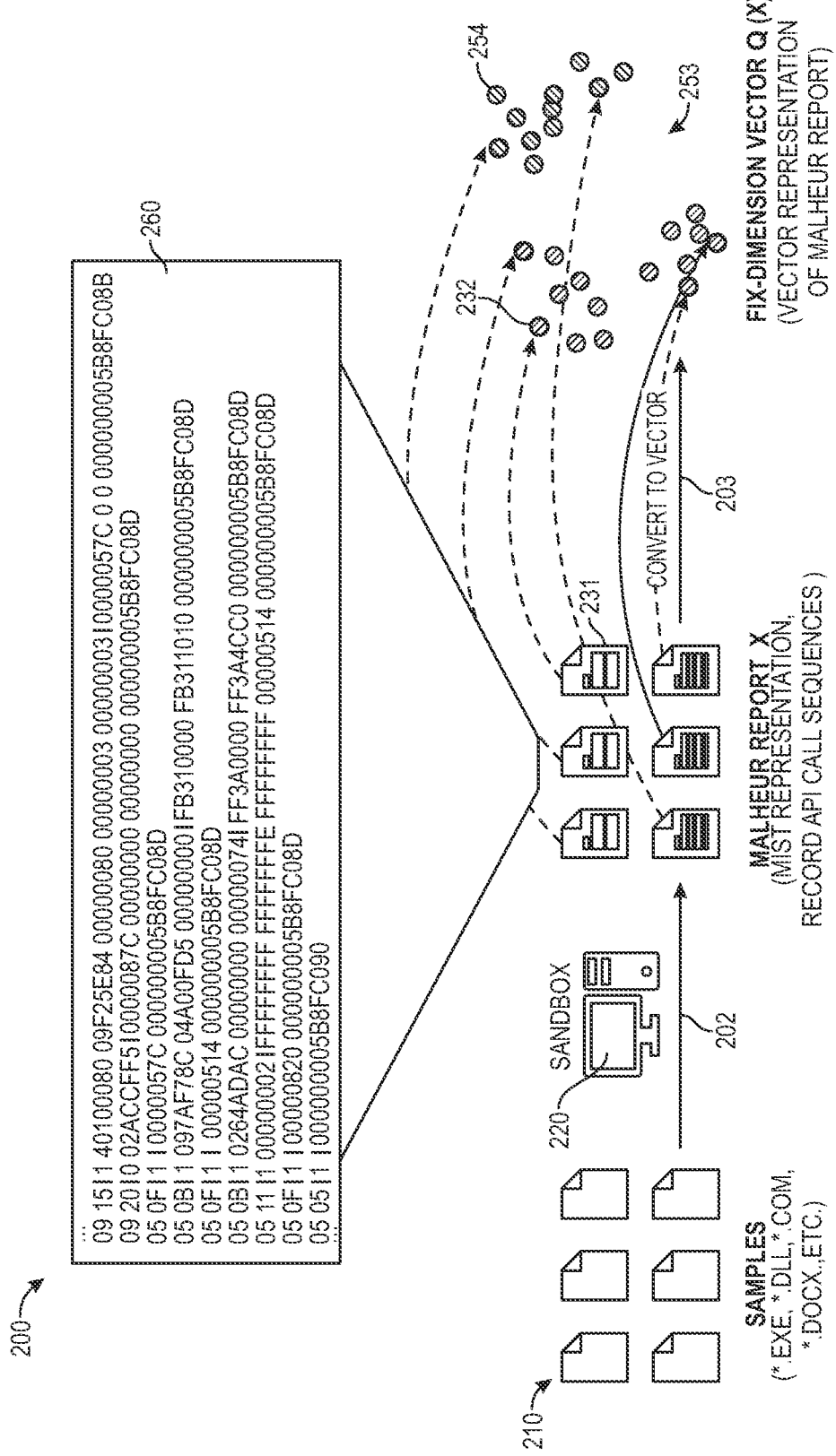
FIG. 2 illustrates an overview of feature vector generation.

FIG. 2 illustrates an overview 200 of behavior report generation and feature vector generation. For each sample file 210 (e.g., *.exe, *.dll, *.com., etc.) submitted into the system, the system in step 202 executes it in the sandbox environment 220, records the behavior, and generates a corresponding Malheur reports x 230 in MIST representations. Next, in step 203, for each sample file, the system convert the sequences of MIST representations for that file into a fixed-dimension vector φ(x). Thus, report 231 results in feature vector 232. Behavior report generation 202 includes monitoring the executing behavior of the unknown sample files 210 by executing the samples in a sandbox 220 and generating the behavior reports 230. Shown are vectors which appear to be in three different groups. Shown also is a MIST representation 260 of a sample. More details are provided in FIG. 5 below.

Figure 3:
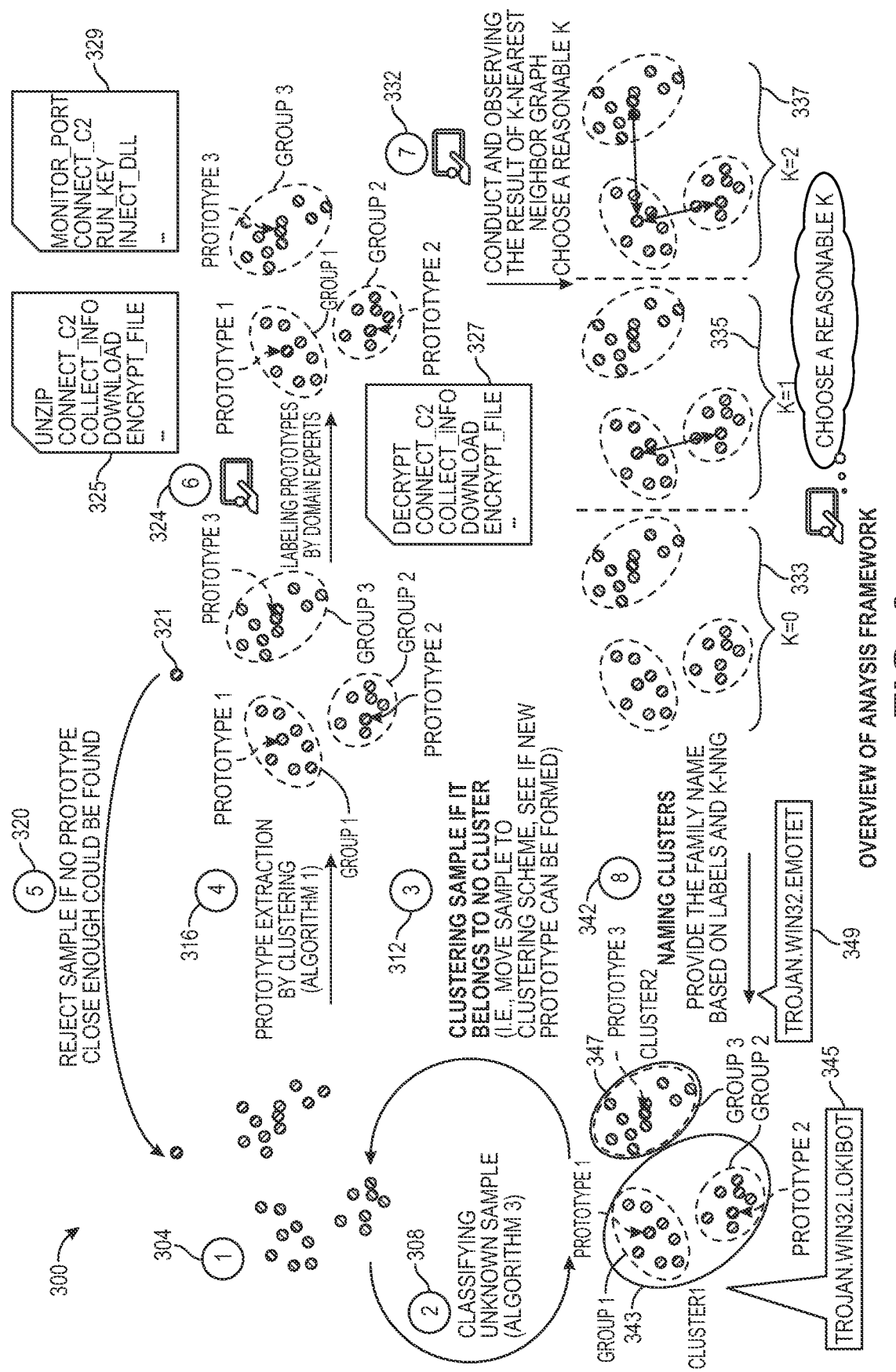
FIG. 3 illustrates an overview of the analysis framework.

FIG. 3 is an overview of an analysis framework 300 describing the processing of sample files (for grouping, prototype extraction, clustering, merging and identification of malware families) and the classification of an unknown sample file in order to determine to which malware family belongs. More detail is provided in FIGS. 5 and 6 below.

In a first step 304, for each sample x, generate its corresponding feature vector φ(x). Next, in 308, check if the generated φ(x) already belongs to a known cluster (i.e., a malware family) by classification, which is described in Algorithm 3. Note that in order to form clusters initially, step 308 need not be performed. In 312, if the sample x cannot be identified as belonging to a known malware family, then move to the clustering step. Thus, for all samples x which cannot be assigned to any known prototypes, clustering all of these samples by Algorithm 1, and check if any new groups are generated. For all new groups generated, extract the corresponding prototype, step 316. More specifically for steps 308-316, after generating the feature vector from the original MIST report of the unknown sample, the feature vector generated would be classified first, seeing if the corresponding unknown sample is already recognized by any prototypes in the system. If not, then clustering would then be conducted for the unknown sample and all samples rejected from the previous clustering task. If the sample is still rejected again, it would be kept until the next clustering task.

For all samples x which cannot form a new group, reject and conduct step 320. Sample 321 is an example of a rejected sample. For the rejected samples, wait until the next data submissions for the next clustering. Prototypes 1-3 show behaviors 325-329 that assist in their labeling. For samples which form new groups, domain experts investigate 324 the behaviors of prototypes, then tag the prototypes with appropriate labels, which provides useful information and attributes for its behaviors (e.g., packers used, files opened, remote host connected, DLL injected., etc.).

Next, in 332, domain experts observe the connectivity of prototypes by K-nearest neighbor graph with different k=0, 1,2, . . . selected 333-337, then aggregate prototypes connected (and their groups) into clusters 343, 347, which are the malware families 345, 349. The connectivity can be evaluated by graph toughness, t=1 is an empirical parameter which leads to a good result. For each cluster (i.e., the malware family generated), specify a family name 342.

MIST Representation, Embedding Function, Clustering and Classifying Algorithms

The dynamic behavior analysis of malware is usually monitored by sandbox tools that intercept the system calls via inline function hooking. However, these tools usually generate XML-based or JSON-based behavior reports, which are human readable, but inappropriate for machine learning-based methods analysis. To address this problem, an expressive feature representation is used. In our framework, the Malware Instruction Set (MIST) [Rieck et al., 2011] is adopted (and incorporated by reference), which converts the sequential-based report into a fixed-dimension q-gram and a feature vector. The generated feature vector can be leveraged by automatic analysis methods which require fixed-dimension input. Moreover, MIST representations and feature vectors are good for both clustering and classification tasks. Below, we describe MIST, embedding functions, feature vectors, and the algorithms used for clustering and classifications tasks, as well as a drawback with the prior art clustering algorithm and our innovative solution.

TABLE I

Monitored API Categories and Amount

| Category ID | Category | Amount |
|---|---|---|
| 01 | Hooking | 2 |
| 02 | Network | 80 |
| 03 | Threading | 12 |
| 04 | Process | 28 |
| 05 | System | 28 |
| 06 | Services | 10 |
| 07 | Synchronization | 8 |
| 08 | Registry | 36 |
| 09 | File system | 38 |
| 0A | Device | 2 |
| 0B | COM | 3 |
| 0C | Windows | 11 |
| 0D | Miscellaneous | 32 |
| 0E | Crypto | 14 |
| 0F | Browser | 3 |

The Malware Instruction Set (MIST) encodes the monitored system call and its arguments using short numeric identifiers. For example, "CopyFileA" will be encoded as "09 01" at the first level of the MIST instruction. In addition, the arguments are encoded at different levels, which reflects information of variable-length arguments based on the granularity required. For example, the file path and mutex name are represented by index numbers, where a global mapping table is used to translate between the original contents and the index numbers.

Assume that the MIST-encoded behavior report of an unknown sample file is denoted as $x \in X$. To characterize the report x by length-q subsequences, the instruction q-gram is employed. Considering $S$ as the set of all possible q-grams, which can be defined as follows:

$$S = \{(\alpha_1, \alpha_2, \ldots, \alpha_q) | \alpha_i \in \mathcal{A}, 1 \leq i \leq q\}$$

Where $\mathcal{A}$ denote the set of all possible instructions mentioned in Table I, where "Amount" refers to the number of API calls belonging to the corresponding category. By giving the set $S$, a report x can be now embedded into $|S|$-dimension vector space. The corresponding embedding function $\varphi(x)$ is defined as follows:

$$\varphi(x) = (\varphi_s(x))_{s \in S} = \begin{cases} 1 & \text{if report } x \text{ contains } q\text{-gram } s, \\ 0 & \text{otherwise.} \end{cases}$$

To reduce the implicit bias caused by the redundancy of behavior and the length of reports, the normalized embedding function is introduced as follows:

$$\hat{\varphi}(x) = \frac{\varphi(x)}{\|\varphi(x)\|}$$

The resulting feature vector $\hat{\varphi}(x)$ based on the malware report x can be now used for clustering and classification tasks using a distance relation between reports that are each represented by their corresponding feature vector. Thus, the pair-wise distance between two malware reports x and z in the embedded space is defined by Euclidean distance as follows:

$$d(x, z) = \|\hat{\varphi}(x) - \hat{\varphi}(z)\| = \sqrt{\sum_{s \in S} \hat{\varphi}_s(x) - \hat{\varphi}_s(z)}$$

Since the feature vector of each malware report is normalized, the values of d(x,z) range from d(x,z)=0 for identical behavior, and d(x,z)=$\sqrt{2}$ for maximally-deviating reports.

In order to cluster or classify a malware report x, a relatively small representative set of prototypes is used for representing the holistic data distribution. Finding such an optimal set of prototypes can be shown to be NP-hard [Garey et al., 1979] (and incorporated by reference). Thus, iteratively extracting prototypes from a set of reports uses Algorithm 1, which resolves the prototype extraction problem in linear time, and the set of prototypes retrieved can be guaranteed to be only twice as large as the optimal solution [Gonzalez 1985] (and incorporated by reference).

| | Algorithm 1 Prototype Extraction |
|---|---|
| 1. | Prototypes ← ∅ |
| 2. | distance(x) ← ∞, ∀x ∈ X |
| 3. | while max(distance(x)) > $d_p$ do: |
| 4. |   choose z such that distance(z) = max(distance) |
| 5. |   for x ∈ X and x ≠ z do: |
| 6. |     If distance(x) > $\|\hat{\varphi}(x) - \hat{\varphi}(z)\|$ then |
| 7. |       distance(x) ← $\|\hat{\varphi}(x) - \hat{\varphi}(z)\|$ |
| 8. |     Prototypes ← Prototypes ∪ {z} |
| 9. |   for x ∈ X do: |
| 10. | $z \leftarrow \min_z(d(x, z))$, ∀ z ∈ Prototypes |
| 11. |   Assign x to cluster z |
| 12. |   return Prototypes |

The distance(x) denotes the distance between the malware report x and its corresponding prototype, and the parameter $d_q$ controls the distance threshold of assigning a malware report x to a particular prototype. The larger $d_p$ is, the more likely that a malware report x can be assigned to a particular prototype z, and a smaller set of prototypes will be returned. Conversely, the smaller $d_p$ is, the less likely that a malware report x can be assigned to a prototype z, and a larger set of prototypes are returned.

Algorithm 1 above is a "clustering" algorithm in that prototype extraction is a kind of clustering which puts the samples with similar behavior into the same group, with a mean data point (we use the name "prototype") extracted to represent all samples of this group. Line 8 of algorithm 1 means "put the selected prototype into the set of prototypes." Note that the prototypes in this set do not have to be feature vectors. Instead, an index-key recording which samples are prototypes may be sufficient, depending upon system implementation.

After the prototype set is determined, K-nearest neighbor graph construction may be conducted to aggregate prototypes from separate groups which share similar executing behavior or characteristics. For those prototypes having only subtle changes between themselves, they are aggregated into the same cluster after observation of the result of the K-nearest neighbor graph in different K scales. Note that the term "clustering" is used to describe the step of grouping samples with similar executing behavior and characteristics during prototype extraction. The term "aggregation" is used below to describe the step of merging prototypes (representing groups of samples) with only subtle changes after human inspection with K-NNG.

A hierarchical clustering technique has been proposed [Duda et al., 2001] (and incorporated by reference). Prototypes with pair-wise distance $\|\hat{\varphi}(z) - \hat{\varphi}(z')\|$ less than $d_c$ are merged into the same cluster to eliminate redundant prototypes. But, this technique relies upon a fixed distance $d_c$; as discussed above, and as shown in FIG. 1, a fixed distance for performing merging is not desirable. We propose using expert input and the K-NNG algorithm (discussed in FIG. 2 and in step 522 below) in order to better perform merging and to better identify the malware families represented by the prototypes.

Note that an Algorithm 2, also refers to "clustering" in [Rieck et al., 2011]. However, this also uses a fixed threshold which violates our observation in FIG. 1. We use an "aggregation" step below, in which prototype merging is determined by domain experts after K-NNG observations. A cluster is formed by incorporating both domain experts' knowledge and the K-Nearest Neighbor Graph result (i.e., the merging process referred to below).

The extracted prototypes, after merging, are used for classifying unknown malware samples (represented by the feature vectors of their reports). Given a malware report x with label unknown, one may classify x by finding the nearest prototype cluster. The process is described by Algorithm 3 as follows:

| Algorithm 3 Classification using Prototypes |
| --- |
| 1.     for x ∈ X do: |
| 2.         z ← $\min_z$ d(x, z), ∀ z ∈ Prototypes |
| 3.         If $\|\hat{\varphi}(z) - \hat{\varphi}(x)\|$ > $d_r$ then: |
| 4.             Reject x as unknown class |
| 5.         else: |
| 6.             Assign x to the class of cluster z |

For each report x, the algorithm determines the nearest prototype of a cluster in the data. If the nearest prototype z is located within the range of radius $d_r$, the report x is then assigned to the respective cluster. Notice that the parameter $d_r$ here controls the distance threshold between the malware report x and the prototype z. The larger the $d_r$ is, the less chance that the malware report x would be rejected.

Specific Example of MIST Representation, Embedding Function and Feature Vector

Figures 4C, 4D:
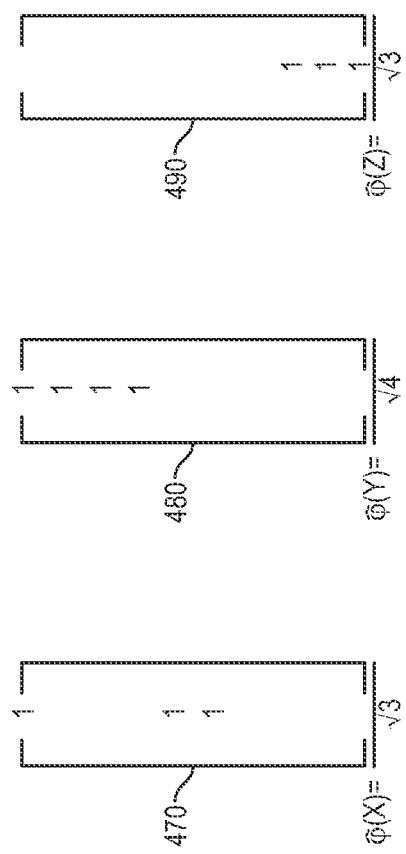
FIG. 4C shows feature vectors.
FIG. 4D shows how to convert a MIST representation to the bigram of FIG. 4B.

FIGS. 4A-4D illustrates how behaviors of malware samples are encoded and then used to generate feature vectors. FIG. 4A illustrates how a particular API call and its arguments are encoded and structured. FIG. 4B shows an example bi-gram. FIG. 4C shows feature vectors.

One line of a Malheur behavior report encoded by a MIST representation looks like line 402 of FIG. 4A. Of course, there will be many such lines, and each line denotes an API call that is encoded in a similar manner. Below, we use an example to illustrate how to encode the MIST representation shown at 402. The representation 402 includes three levels, 404-412, as will be explained below.

The function NtCreateFile is one of the most commonly used operations. It creates or opens a file, which allows the developer to gain access of a single file, file system, directory, or console buffer. It can be indicative of malware. To invoke NtCreateFile, the following parameters are specified: FileHandle, DesiredAccess, FileName, FileAttributes, Share Access, CreateDisposition, ExistedBefore, StackPivoted. The NtCreateFile is encoded by category index 09 (File System) and API index 15, with the rest of the arguments encoded as the example below in Table 2.

TABLE 2

Encoding of API Call

| | Original Value | MIST representation |
| --- | --- | --- |
| Level 1 | | |
| NtCreateFile | | 09 15 |
| Level 2 | 1 | 1 |
| Share Access | GENERIC_READ\|FILE_READ_ATTRIBUTES\| | 80100080 |
| DesiredAccess | SYNCHRONIZE (0x80100080) | 018b0653 |
| FileName | %AppDataLocal%\\Microsoft\\\Windows\\Caches\\ | 1 |
| CreateDisposition | [random_number].db | 0 |
| FileAttributes | FILE_OPEN (1) | |
| | 0x00000000 | |
| Level 3 | | |
| FileHandle | 0x00000168 | 00000168 |
| ExistedBefore | yes | 1 |
| StackPivoted | no | 0 |

Therefore, the original API call shown above will be encoded as shown in FIG. 4A. A q-gram computation example is now provided, based upon the explanation above, in which q=2, i.e., a bi-gram. In our system, we leverage the bi-gram (i.e., q=2) to encode the Malheur report for further comparison in order to check if Malheur reports shares similar consecutive API calls. For example, suppose that the sandbox recorded samples x, y, z which contained the following behavior: Report x: CreateFileA→WriteFile→CloseHandle→WaitSingleObject; Report y: CreateFileA→WriteFile→ReadFile→WriteFile CloseHandle; and Report z: RegOpenKeyExA→RegQueryValueExA→RegSetValueExA→RegCloseKey The bi-gram will then be as shown in FIG. 4B. Columns 420-440 list each report, showing the respective behaviors 422-442 in bi-gram form. Rows 451 and 452 show common behaviors.

In the case shown above, the set S of all possible bi-grams can be defined as below:

$$\mathcal{S} = \{(\alpha_1, \alpha_2) | \alpha_i \varepsilon \mathcal{A}, 1 \leq i \leq 2\} = \{s_1, s_2, \ldots, s_8\}$$

With $|\mathcal{S}|=8$ and $\mathcal{A}$ denotes the set of all possible instructions $\alpha_1, \alpha_2, \ldots, \alpha_{307}$ mentioned in Table I above. Based on the embedding function $\varphi(x)$ and its normalized form $\hat{\varphi}(x)$:

$$\varphi(x) = (\varphi_s(x))_{s \in \mathcal{S}} = \begin{cases} 1 & \text{if report } x \text{ contains } q\text{-gram } s, \\ 0 & \text{otherwise.} \end{cases}$$

$$\hat{\varphi}(x) = \frac{\varphi(x)}{\|\varphi(x)\|}$$

The embedded results of report x, y, z, i.e., the feature vectors, are now shown in FIG. 4C at 470-490.

FIG. 4D shows how to convert a MIST representation to the bigram of FIG. 4B. As described above, the feature vector of FIG. 4C is based upon the bigram of FIG. 4B (which shows only the API calls); the below describes how the MIST representation of FIG. 4A is used to create FIG. 4B by using MIST Level 1.

Using the example, of FIG. 4D: 09 is the file system category, 15 is NtCreateFile; 09 is the file system category, 20 is NtWriteFile; 05 is the system call category, 0f is NtClose; 05 is the system call category, 0b is LdrGetProcedureAddress; 05 is the system call category, 0f is NtClose; etc.

This can be inferred as the sequences of NtCreateFile→NtWriteFile→NtClose→LdrGetProcedureAddress→NtClose as the form mentioned in FIG. 4B. Therefore, FIG. 4A is only one line from a given sandbox report, which typically consists of multiple MIST representations.

In order to compare if pair-wise Malheur reports are similar or not, we evaluate by the distance:

$$d(x, z) = \|\hat{\varphi}(x) - \hat{\varphi}(z)\| = \sqrt{\sum_{s \in \mathcal{S}} \hat{\varphi}_s(x) - \hat{\varphi}_s(z)}$$

We thus get: d(x,y)=0.9194 and d(x,z)=1.4142.

Intuitively, since both report x and y shares the following bi-gram CreateFileA→WriteFile and WriteFile→CloseHandle, we observe that x and y are much closer than x and z, and it is much more possible that x and y belong to the same malware family.

Note that the example shown above considers only the API name (i.e., MIST level 1). To leverage as much information captured from the sandbox as possible, the MIST level 2 features (and above) are also used in order to construct a robust bi-gram representation.

Flow Diagram—Extract and Merge Prototypes

Figure 5:
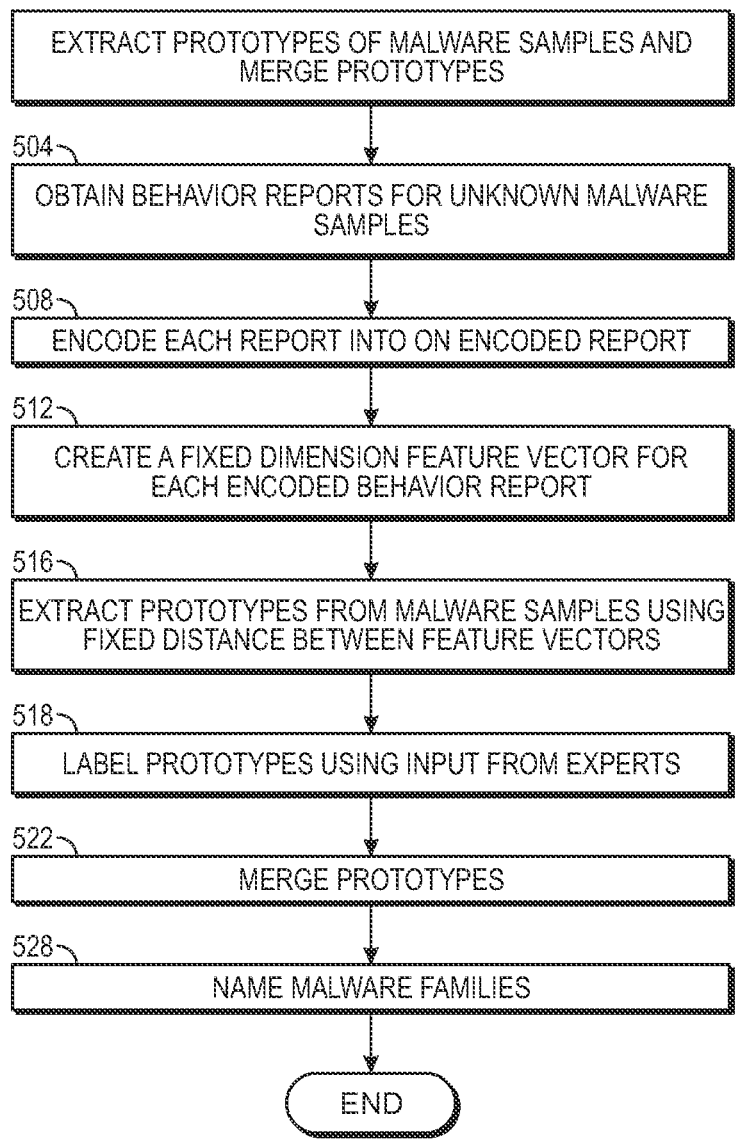
FIG. 5 is a flow diagram describing how prototypes are extracted from the malware samples, labeled and then merged.

FIG. 5 is a flow diagram describing how prototypes are extracted from the malware samples, labeled and then merged. In a first step 504 any number of behavior reports for unknown suspicious samples are obtained, one behavior report for each unknown sample. These samples are suspicious (and might be malware), but some may be benign.

As known to those of skill in the art, and as illustrated in FIG. 2 at step 202, each unknown sample is executed within a so-called "sandbox" application (such as "Cuckoo" or "CWSandbox") on a computer, the behaviors of that sample are monitored, and a behavior report is generated that lists the API calls and other actions taken by the unknown sample. FIG. 4B shows example API calls are made by an unknown sample.

In a next step 508 each behavior report is encoded to create an encoded report. An example of such encoding is shown in FIG. 4A. Thus, each behavior of an unknown sample is encoded (typically using a numerical representation, but other symbolic representations may be used) and the resulting encoded report is then used to facilitate creating the feature vector in the next step.

In step 512 a fixed-dimension feature vector is created for each encoded behavior report. For example, the above describes how MIST encoded instructions may be used to create a feature vector for each behavior report. These feature vectors representing the unknown samples will then be used to extract prototypes from the collection of unknown samples.

The feature vector here, which is denoted as $\hat{\varphi}(x)$ in algorithm 1, is information extracted from the MIST report x of the sample. The purpose of generating the feature vector instead of using x directly is because that a comparable, or distance-measurable representation of x is required before conducting the similarity evaluation. Neither the pair of binary executable files, nor the pair of MIST reports are distance measurable. Therefore, the function $\hat{\varphi}(\cdot)$ in algorithm 1 is performed in order to generate the feature vector from the MIST representation for the further tasks, including: prototypes extraction mentioned in algorithm 1; aggregating prototypes into clusters by executing the K-NNG algorithm; and the classification tasks mentioned in algorithm 3. Therefore, a prototype is a representative sample, but both its extraction and the aggregation into clusters requires a feature vector representation $\hat{\varphi}(x)$, since distance metrics are required for all these steps.

In step 516 a clustering algorithm is used to extract prototypes from the unknown samples (represented by the feature vectors) that uses a fixed distance threshold to cluster samples around each prototype. As shown in FIG. 3 at 316, three clusters of prototypes are shown, for example, prototypes 1-3. Above is described a technique in Algorithm 1 for extracting prototypes using a set of feature vectors. As described, a distance parameter controls the distance threshold of assigning malware reports to particular prototypes. Depending upon design choices, the distance parameter may be made smaller or larger (resulting in greater or fewer extracted prototypes), but, during a particular extraction of prototypes, this distance parameter will be the same for all prototypes.

As used herein, a "prototype" refers to a representative sample extracted from a group of samples, whose characteristics and executing behavior is similar to other samples belonging to the same group. Both "sample" and "prototype" here both represent file submissions shown at 210, and after the sandbox report generation of step 202 in sandbox 220, the generated reports shown at 230 record the samples' running behavior in MIST representation, and can be denoted as either x or z in algorithm 1. More specifically, a "prototype" means a representative sample, whose executing behavior or characteristics are similar to samples from the same group. Thus, during the prototype extraction, the prototype has been selected to represent all samples of the particular group.

Figure 7A:
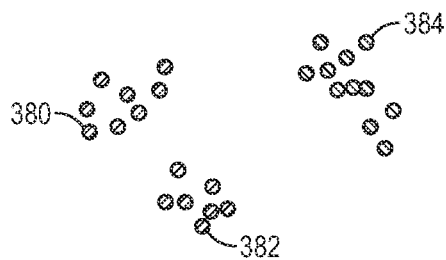
FIGS. 7A-7C show samples, prototypes, groups and clusters.
Figure 7B:
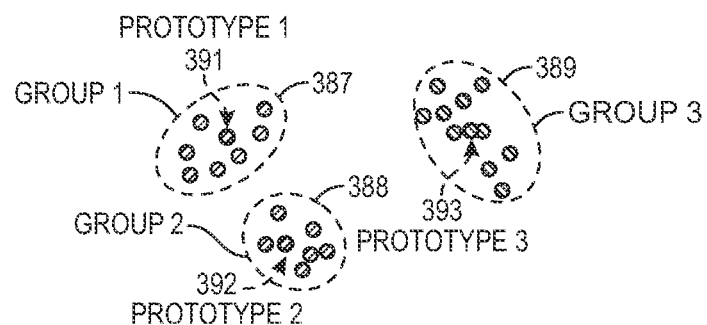
Figure 7C:
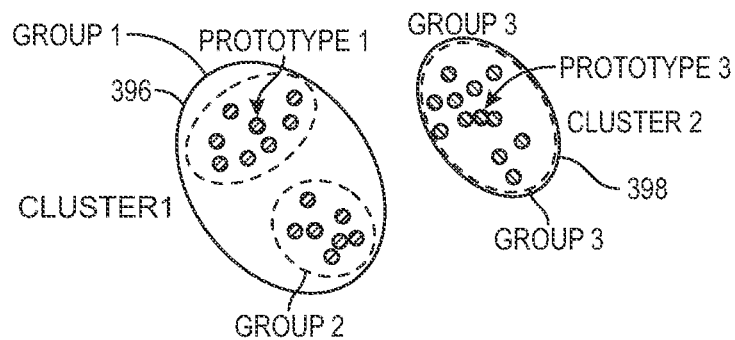

FIGS. 7A-7C show samples, prototypes, groups and clusters. Take FIG. 7A for instance; each data point (such as 380, 382 and 384) represents a suspicious sandbox report of a sample. If there are other samples recorded with very similar behavior in their corresponding reports, then such samples can be clustered into a group. A step of prototype extraction (or identification) illustrated in FIG. 7B shows that groups 387, 388 and 389 have been identified and the step has chosen a representative sample as a prototype of each group. Thus, prototype 391, prototype 392, and prototype 393 are also samples, but each is representative of the samples from group 1, group 2 and group 3, respectively.

After prototype extraction, a domain expert may determine if some prototypes only differ because of subtle changes or variants. For example, after a detailed inspection with the K-NNG results, a domain expert finds that both prototype 1 and prototype 2 exhibit the behavior of "Trojan.Win32.Emotet" (a family name). The only difference is that the two prototypes connect to different C&C servers one contains an unpacking routine. The expert also determines that Prototype 3 exhibits the behavior of Trojan.Win32.Lokibot (another family name).

Under these circumstances, the domain expert merges both prototype 1 and prototype 2 into cluster 1, since both of them belong to Trojan.Win32.Emotet family. And, the expert merges only prototype 3 into cluster 2, since only cluster 2 has the behavior of Trojan.Win32.Lokibot. The above aggregations are shown in FIG. 7C.

At this stage of the process the malware families have not been determined yet. The prototypes represent collections of behaviors but not necessarily a malware family. In fact, because families have variants, a particular malware family may actually be represented by one or more prototypes. More specifically, a prototype may be represented as a feature vector which itself represents the behaviors of various samples.

In a next step 518 input from a domain expert or experts 324 is used to label each prototype, and each label may refer to a malware family or to a particular behavior. In this step one or more domain experts review the characteristics and properties of the prototypes and determine if a prototype represents a particular malware family, or, if not, if a particular prototype exhibits certain suspicious behavior (such as downloading files, writing files, etc.). Based upon this analysis by the domain expert, the domain expert provides labels for each prototype indicating the name of the malware family or the name of particular behaviors. The expert may also indicate whether or not two particular prototypes are so similar that they should be merged in the next step.

The domain expert reviews each prototype and provides labels for different aspects, including (but not limited to) its executing behavior, target platform, the malware author and campaigns, or the known naming which already has been discovered by other third-party vendors. The purpose of such labeling is to summarize the behavior of the prototype to help with the naming of the malware families later on.

Take the Ransom.Win32.Gandcrab ransomware, for example; the known behavior after investigation of the prototype comprises: targeting Windows 32-bit platform; computer information collection (e.g., user account, domain account, computer name, etc.); contacting the C&C server and sending the computer information collected; calling the Windows encryption API to generate a secret key; encrypting all files stored in local drives and remote disks; and dropping a file named KRAB-DECRYPT.txt on the user's desktop, indicating how to pay the money to decrypt his or her file.

In domain experts' view, before making the final decision on the malware's family it belongs to, the domain expert may assign a clear and readable label, which are used as attributes denoting the behaviors, like "win32", "connect_c2", "call_encrypt_api", "encrypt_file", "drop_file", "krab-decrypt.txt", etc. Such labeling assists domain experts in investigating samples with similar behavior. Furthermore, by using these tagged labels in the following prototype aggregation step, we will know that: it is ransomware due to "encrypt_file" label; it is Windows 32-bit malware due to "win32" label; and it came from the Gandcrab campaign due to the message in "krab-decrypt.txt". During the cluster naming step 342, the domain experts provide an appropriate name for the cluster which comprises this prototype. In this case, the domain expert names the cluster as a variant of Ransom.Win32.Gandcrab based on labels added before.

The domain expert provides labels to the prototype by using a RESTful API call in our system; here is an example: add label to prototype which ID=1000 with "win64" and "encrypt_file" (curl-X PUT-F label=win64-F label=encrypt_file/api/v 1/prototype/1000/label); update label to prototype which ID=1000 with "win32" and "encrypt_file" (curl-X POST-F label=win32-F label=encrypt_file/api/v 1/prototype/1000/label); and delete particular label "encrypt_file" to prototype which ID=1000 (curl-X DELETE-F label=encrypt_file/api/v1/prototype/1000/label).

Next, in step 522 an aggregation step is performed in order to merge prototypes. This step is performed in order to merge one or more prototypes into a particular malware family. As mentioned above, it has been realized by the inventors of the present application that a fixed distance threshold does not work well for merging prototypes in order to determine malware families, thus, a fixed distance threshold is not used for performing merging. In one particular embodiment, the K-Nearest Neighbor Graph (K-NNG) is used to merge prototypes. This graph is constructed by connecting the top K nearest neighbors for each of the scattered prototypes. In order to best determine the malware families and variants, the graph toughness is used to measure the graph connectivity. For example, a 1-tough graph that results after the aggregation step can be viewed as a malware family. Thus, the distance used to merge prototypes is not a fixed distance but may be variable.

K-NNG here is used as a visualization tool for domain experts to evaluate the connectivity of scattered prototypes at different levels. Domain experts set the different k values, the system then helps to construct the sub-graphs by K-NNG according to the value k specified. After a careful review of the choice of k, prototypes from the same sub-graph are aggregated into one cluster (i.e., the final malware family).

Figure 9A:
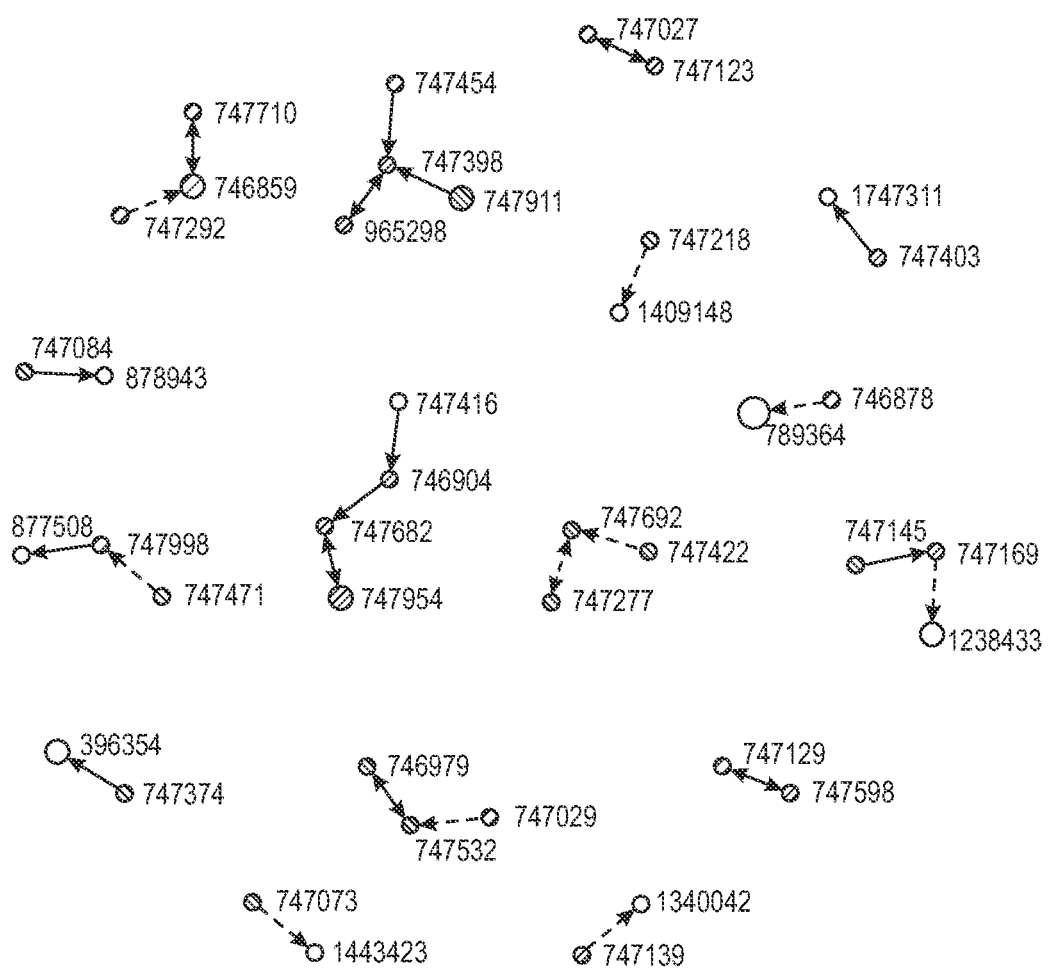
FIGS. 9A, 9B and 9C are sample graphs of Zegost prototypes.
Figure 9B:
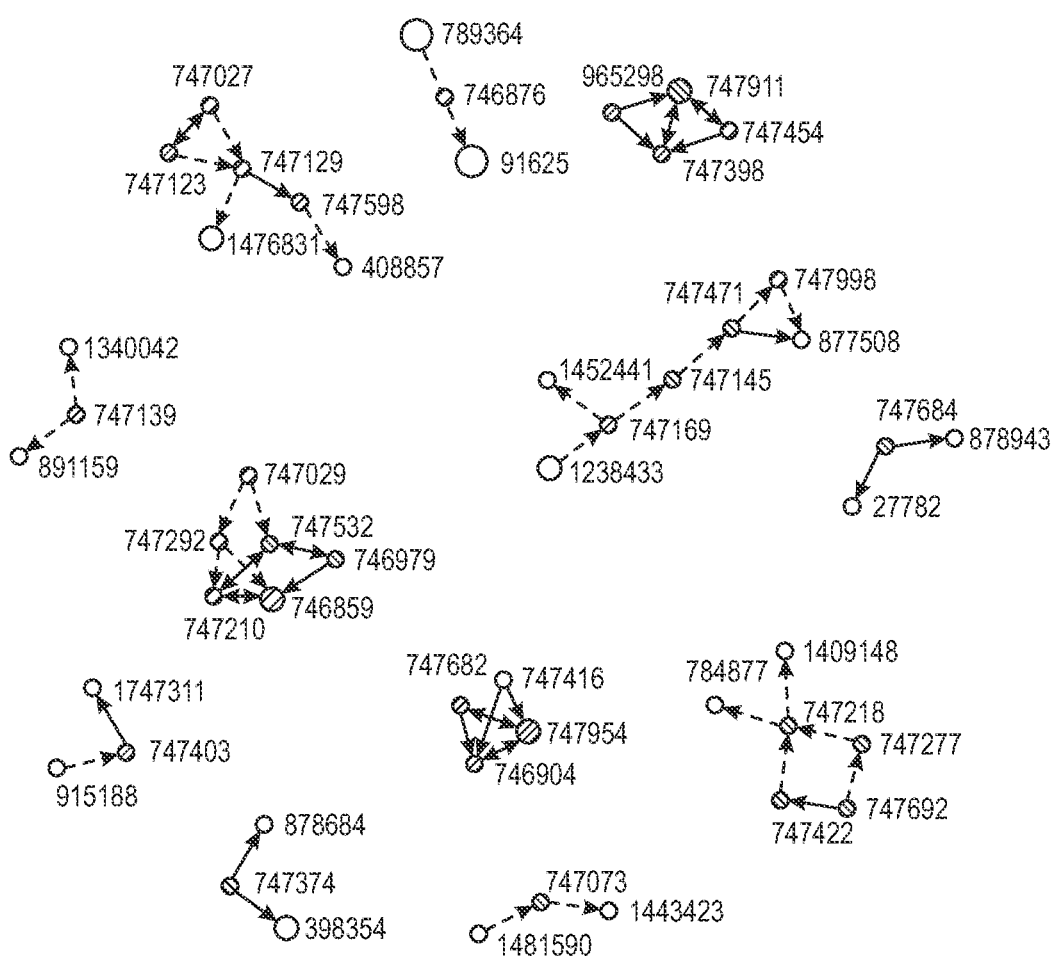
Figure 9C:
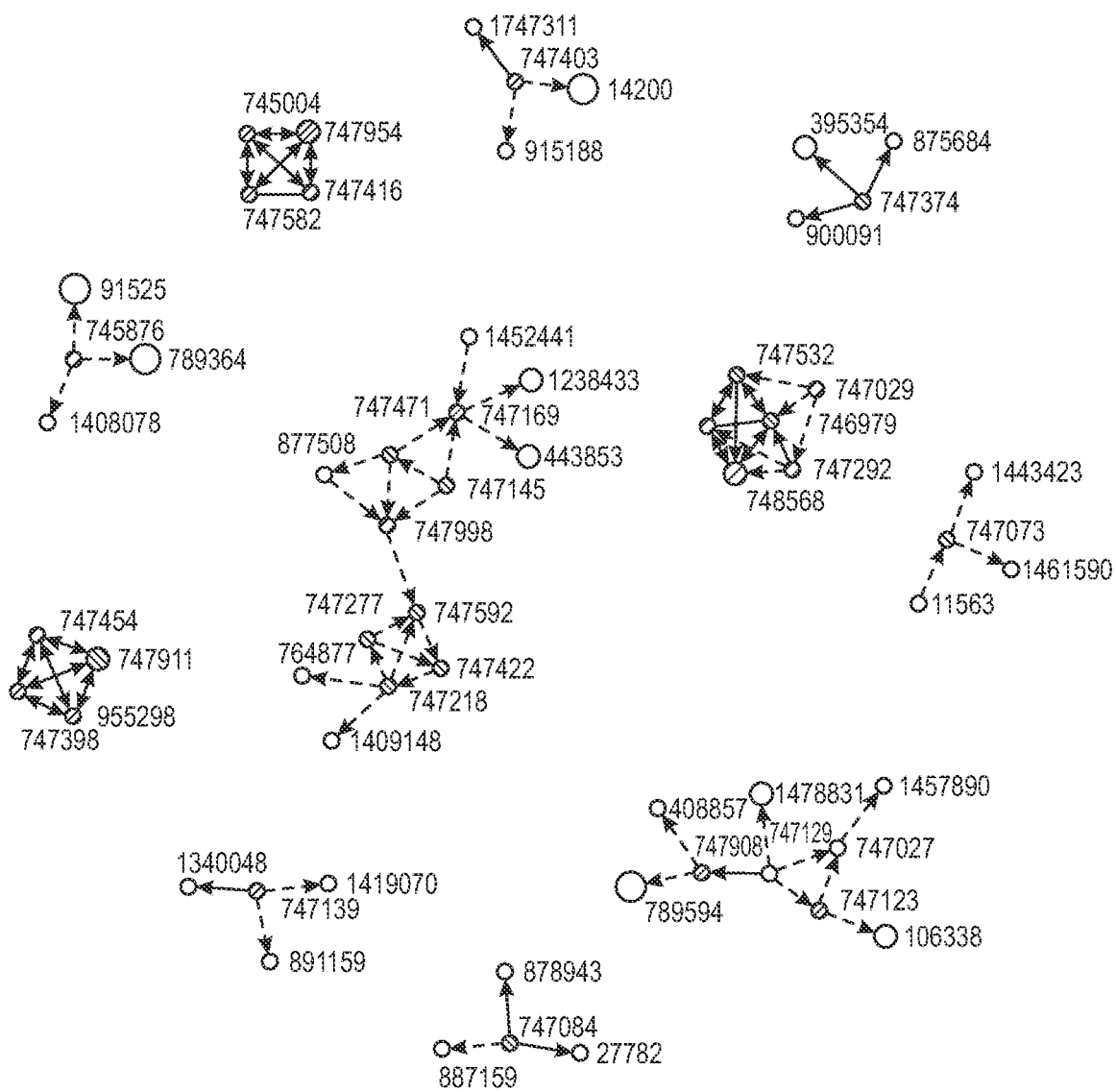
Figure 10A:
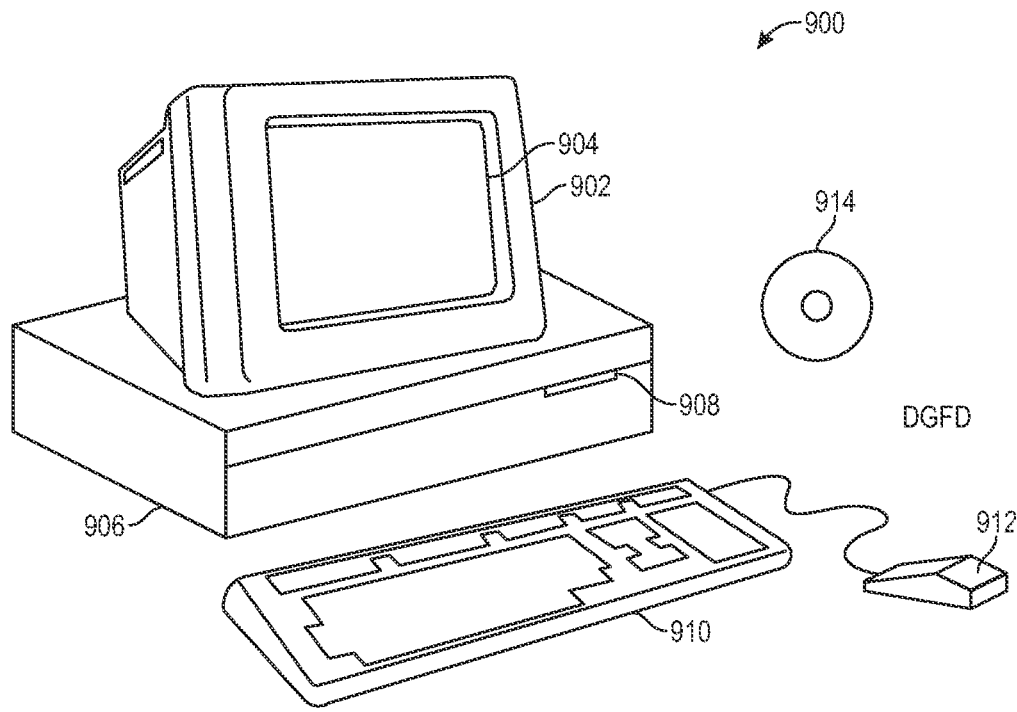
FIGS. 10A and 10B illustrate a computer system suitable for implementing embodiments of the present invention.
Figure 10B:
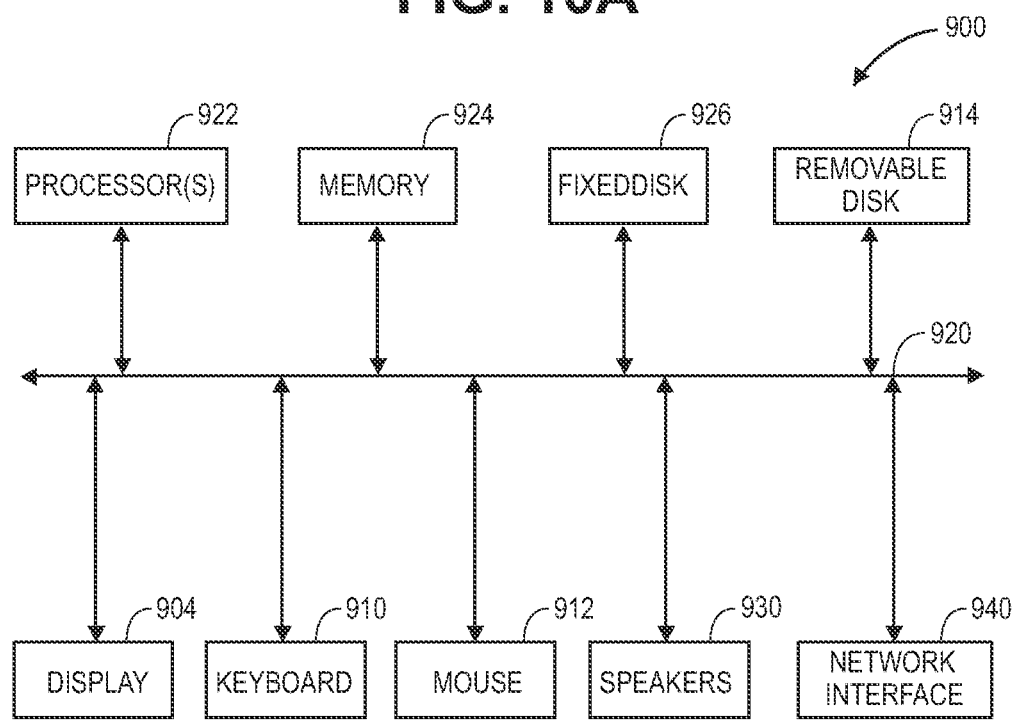

FIGS. 9A, 9B and 9C are sample graphs of Zegost prototypes, constructed by K-NNG with: (a) K=1, (b) K=2, and (c) K=3, FIGS. 9A, 9B and 9C, respectively. To illustrate the effect caused by selecting different k, refer these figures. In FIG. 9A, a smaller k has been chosen, and it guarantees that most of the prototypes in the connected graph belong to the same family, because only prototypes that are similar enough (i.e., belongs to the top k nearest neighbor, where k is a small value) can be connected into the same graph. However, more sub-graphs are generated and required to be analyzed, which increases the human effort. In other words, choosing a larger k accommodates more prototypes into the same sub-graph, which reduces the number of sub-graphs generated, leading to less effort required. However, such a choice of k may result in prototypes that come from different families being mistakenly merged into the same sub-graph, since a larger k tolerates prototypes with less similarity.

To simultaneously balance the intra-similarity of vertices in the generated sub-graph and the number of sub-graphs generated, the graph toughness is used to measure the connectivity. A graph is said to be t-tough if, for every integer s, the graph cannot be split into s different connected components by the removal of fewer than ts vertices. In other words, the higher the toughness is, the more solid the connectivity of the graph. Based on the observation of FIGS. 9A-9C, one sees that a larger k leads to more toughness of the generated sub-graphs, discovering more possible connections between prototypes, but leads to fewer prototypes' intra-similarity of the sub-graphs. A smaller k, however, leads to less toughness, but, the vertices' similarity can be guaranteed. In one embodiment, we choose k to be as small as possible, and preferably, it is desirable to keep t≥1.0 at least in order to guarantee the connectivity of the generated graph.

There are many heuristic rules for determining whether to merge or not merge two prototypes. Here we provide two examples to illustrate how to determine merging or not merging. Consider the case where malwares share similar behaviors, but evolve as different malware families. A case is Ransom. Win32.Gandcrab and Ransom. Win64.Anatova. Observing the malware sandbox reports or their execution behavior, it is noted that both of them contain very similar API call sequences, including computer information collection, connecting to C&C server, generating encryption private keys, enumerating disk volume information on the disk, and encrypting all files.

The only differences which can be observed are different drop file names (KRAB-DECRYPT.txt and ANOTOVA.txt), and the target platform (win32 and win64). Since both come from the same source code package (bought on the black market), these two ransomwares share similar behavior. However, because a ransom is paid to different malware campaigns, they have different malware family names. Under such circumstances, even though the prototypes have similar behaviors, the domain experts tend not to merge the prototypes from these two malware families.

Consider the case where malwares contains different behaviors, but evolve as the same malware family. Some types of malware is modularized and can easily evolve into new variants fast. A typical case is malware which leverages different packers. Some packers rely upon a file decompression mechanism, while some packers rely upon decrypting (e.g., XOR) payloads into original malicious executable in multiple phases. Both unpacking mechanisms are able to generate the same malicious executables, but the unpacking mechanism consists of different behaviors, which lead to different MIST representations. Under such circumstances, since prototypes of these two variants comes from the same family—only packed with different packers—we cannot say that these two variants belong to different families.

Based on the above two case discussions, we realize that merging relies upon a domain experts' analysis, which is the reason why hierarchical clustering is used. By using the prototype extraction of Algorithm 1, placing samples that are similar enough into the same group, and then aggregating prototypes from these groups based on human observation of K-NNG in different levels (i.e., k=1,2,3, . . . ), the experience of domain experts and automatic clustering are integrated.

In step 528 the final prototypes (which may or may not have been merged) are provided with definitive malware family names such as "Loki" 291 and "Emotet" 292. As mentioned above, in addition to the possible family name, the labeling step 324 may also be used to annotate the sample with its execution behavior. For example, "connecting to the C&C server," "writing registry," "inject malicious DLL into processes," etc. The malware family name will vary. Domain experts typically follow the CARO rule (known to those of skill in the art) to assign a name to a newly-formed cluster in a consistent format. Here are some aspects (but not limited to these) which are considered during the naming procedure: malware type (e.g., Trojan, ransomware, adware, etc.); execution platform (e.g., Win32, Win64, Linux, etc.); author or attacking campaign of the malware (e.g., Gandcrab, Anatova, Petya are named from their attacking groups); and the name which has already been provided by a third-party vendors (e.g., VirusTotal).

Flow Diagram—Classify Sample

Figure 6:
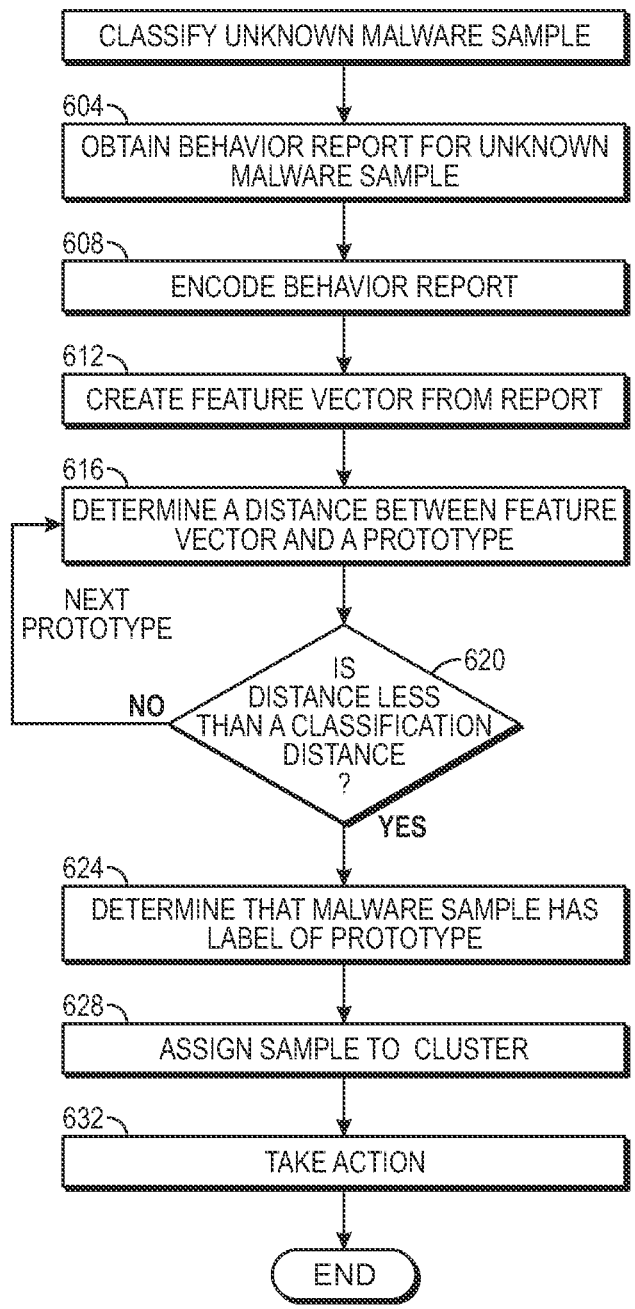
FIG. 6 is a flow diagram describing how an unknown sample is classified.

FIG. 6 is a flow diagram describing how an unknown sample is classified. In general, if the feature vector of an unknown sample is close to an existing prototype having a malware family name (such as shown at 347 in FIG. 3), then that unknown sample will be classified as being a member of that malware family. By contrast, if it is determined that the unknown sample is not close to an existing prototype then it is determined that the unknown sample is a new type of emerging file, which can be a normal file, or may be a new type of malicious file. The purpose of the malware hierarchical clustering focuses on finding and correlating similar files which are already suspicious. Such suspicious files can be submitted by either a standard sourcing channel or by a customer.

Steps 604-612 are performed for a single unknown sample and the steps may be performed as has been previously described in steps 504-512 of FIG. 5. Next, in step 616, a loop is begun in which a distance between the feature vector for the unknown sample is determined for any of the prototypes which were named as being a malware family in step 528. In step 620 the distance determined for first prototype is compared to a classification distance. Preferably, this classification distance is the same fixed distance used in step 516 above used to cluster the samples in order to extract prototypes. If the distance is greater than a classification distance, then control returns to step 616 in order to select the next prototype. If the distance is less than the classification distance then in step 624 it is determined that the unknown sample belongs to the same malware family as a prototype. For example, if the unknown sample is close to the prototype named as the malware family "Loki" 291, then it is determined that the unknown sample is malware and belongs to that same family.

In step 628 the unknown sample may be assigned to the cluster of samples belonging to that named malware family. If the unknown sample cannot be assigned to the known prototypes, this means a new type of malware may have emerged. Such unknown samples will be collected and returned to the clustering scheme, to see if new malware families can be found.

Typically, the system does not clean or delete malware since the purpose of hierarchical clustering is not to focus on real-time scanning or detection on an endpoint's platform. Instead, the system is designed for backend analysis in order to reduce the human effort needed to analyze numerous samples. Therefore, once the sample is assigned into a cluster at step 628, this record is inserted into a backend database for later analysis.

Production Environment Example

Figure 8A:
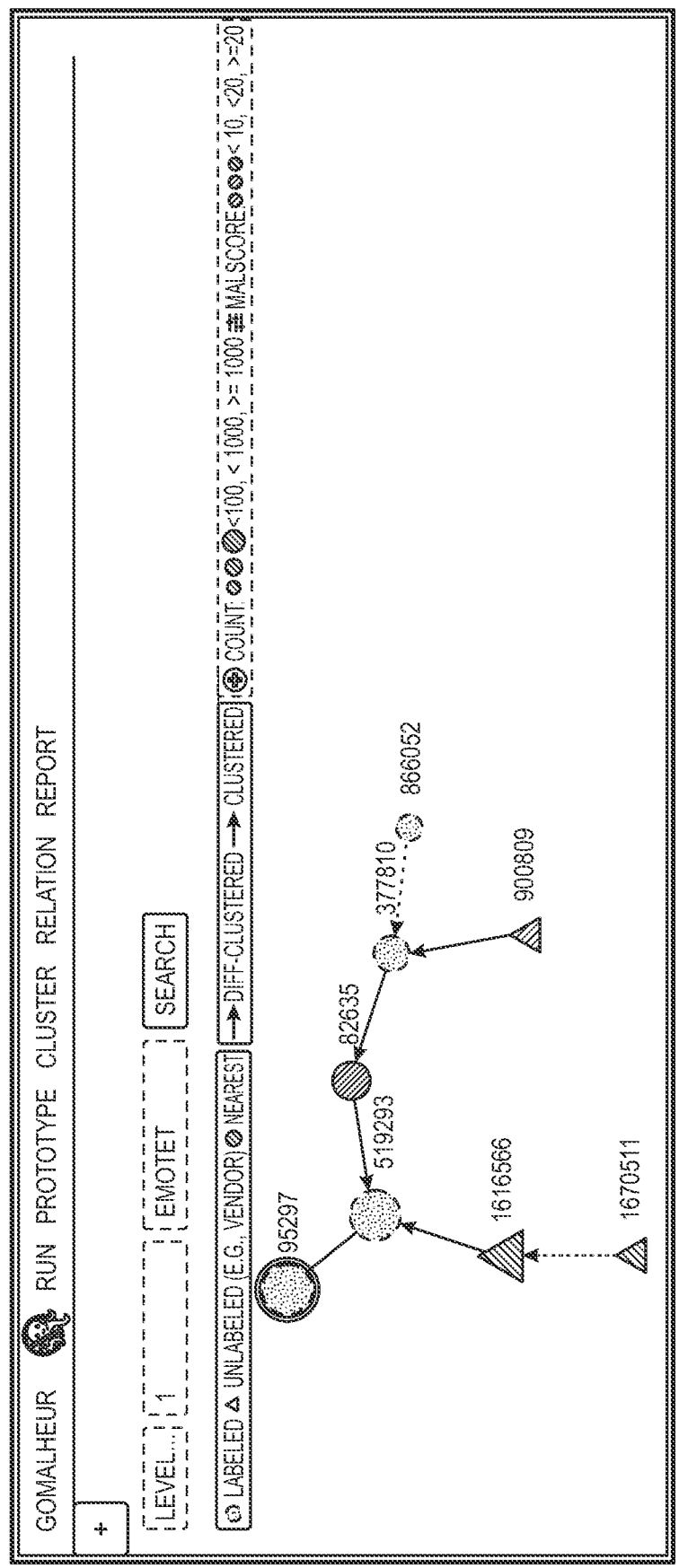
FIGS. 8A and 8B provide an example in a production environment.
Figure 8B:
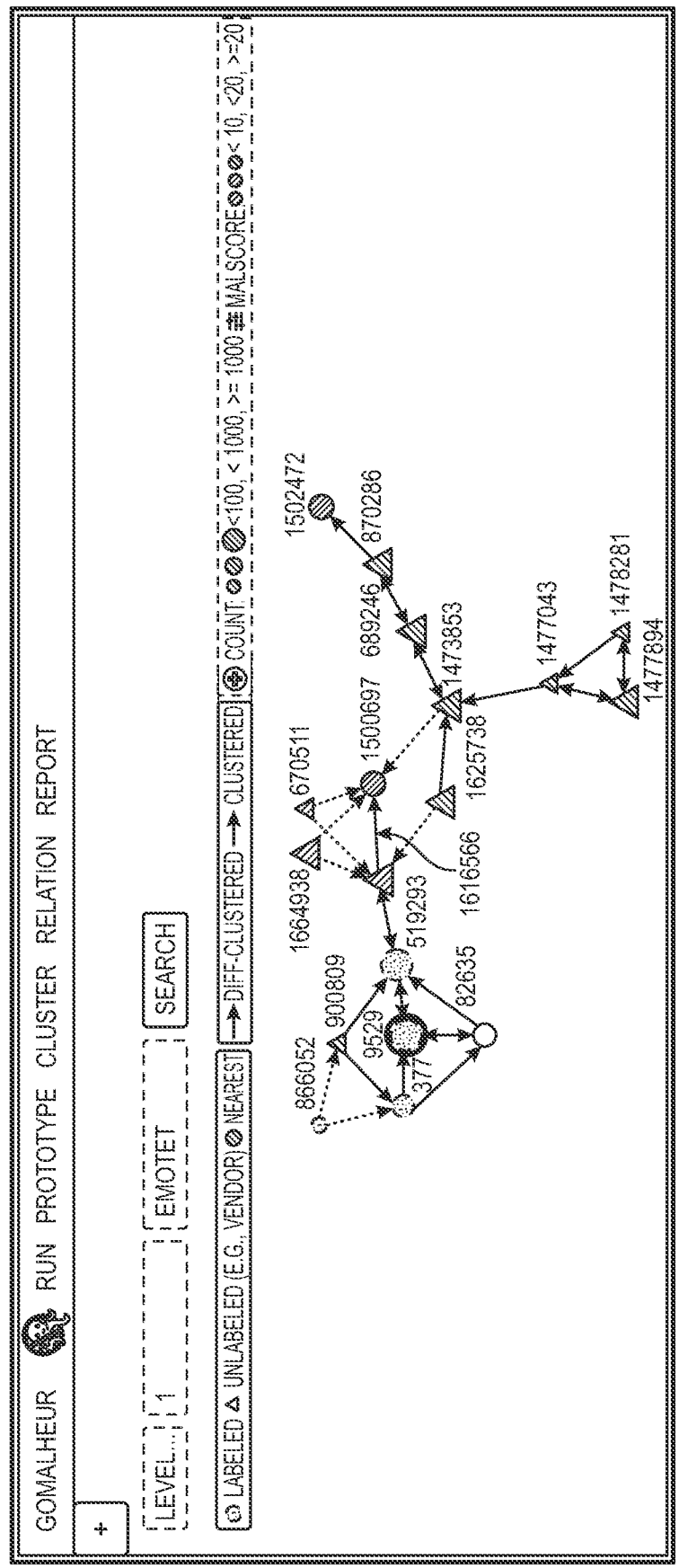

FIGS. 8A and 8B provide an example of steps 324, 332 and 342 in a production environment showing our hierarchical clustering system. Shown are sample graphs of Emotet prototypes, constructed by K-NNG with: (a) k=1 (FIG.

8A) and (b) k=2 (FIG. 8B). Here, we use the prototype initially named as ID 95297 to provide an example of the steps 324, 332 and 342. As shown, each graph or sub-graph represents a cluster (i.e., a malware family), with each vertex being a prototype.

In step 324, after the investigation of the prototype, the domain expert added the labels to 95297, with the labels denoting behaviors, or possible malware family names of the prototype. In step 332, the domain expert wants to investigate other prototypes which also possess the same behavior. The domain expert then constructs the K-nearest neighbor graph in different scales (k=0, 1, 2, . . . ) in order to observing the connectivity. After carefully selecting k, the system aggregates all of prototypes in the same graph into the same cluster. In step 342, since the cluster is already formed, the only task remaining is naming the cluster. The domain expert then names this cluster based on its behavior, the attacking campaign, or the names provided by $3^{rd}$ party vendors. In this case, the cluster is a variant of Trojan.Win32.Emotet.

Computer System Embodiment

FIGS. 7A and 7B illustrate a computer system 900 suitable for implementing embodiments of the present invention. FIG. 7A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 7B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of identifying a malware family, said method comprising:
creating a feature vector for each of a plurality of behavior reports of suspicious files, each feature vector representing API (application programming interface) calls of said each malicious file;
extracting a set of prototype feature vectors from said feature vectors using a fixed-distance threshold;
receiving input that applies labels to at least two of said prototype feature vectors;
merging said two labeled prototype feature vectors into a single cluster using a K-NNG (K-Nearest Neighbor Graph) without using a fixed-distance threshold; and
naming said single cluster as an identified malware family.

2. A method as recited in claim 1 wherein a number of clusters after said merging is not determined before said step of extracting.

3. A method as recited in claim 1 further comprising:
performing said steps of extracting and merging in linear time with respect to a number of said feature vectors.

4. A method as recited in claim 1 further comprising:
generating said behavior reports by executing each of said suspicious files in a sandbox software application on a computer.

5. A method as recited in claim 1 wherein each of said feature vectors is based upon a q-gram of said each corresponding behavior report.

6. A method as recited in claim 1 wherein each of said prototype feature vectors represents a non-overlapping subset of said feature vectors.

7. A method as recited in claim 1 wherein said K-NNG has a variable k value.

8. A method as recited in claim 1 further comprising:
  displaying said K-NNG on a computer; and
  accepting user input indicating a selection of said K-NNG before said merging.

9. A method as recited in claim 1 wherein said single cluster represents said identified malware family.

10. A method as recited in claim 1 further comprising:
  displaying using a visualization tool said feature vectors on a computer; and
  accepting user input on said computer indicating said single cluster.

11. A method as recited in claim 10 wherein said visualization tool is a k-NNG (k-nearest neighbor graph).

12. A method as recited in claim 11 further comprising:
  accepting said user input on said computer indicating a value for k in said k-NNG before said accepting.

\* \* \* \* \*